United States Patent [19]
Ali Zade et al.

[11] 3,805,620
[45] Apr. 23, 1974

[54] DEPTH PRESSURE GAUGE

[76] Inventors: Ali Ashraf Abdul Gusein Ali Zade, Prospekt Kirova, 14/70, kv. 26; Eldar Shirali Aliev, ulitsa Surena Osipiana, 33b, kv. 148; Konstantin Vladimirovich Vinogradov, ulitsa Chapaeva, 18, kv. 7; Farkhad Aga Gamzaev, ulitsa 28 Aprelya, 72, kv. 25; Mir Samed Ali Movsumzade, ulitsa Malygina, 2, kv. 2; Alexandr Mikhailovich Pirverdian, ulitsa Sameda Vurguna, 81, kv. 12; Aslan Bakhram Sultanov, ulitsa 16 Yazavokzalnaya, 15, kv. 3, all of Baku, U.S.S.R.

[22] Filed: Apr. 11, 1972

[21] Appl. No.: 243,051

Related U.S. Application Data

[63] Continuation of Ser. No. 10,723, Feb. 12, 1970, abandoned.

[52] U.S. Cl. ............................ 73/419, 73/300
[51] Int. Cl. .................................. G01l 7/16
[58] Field of Search ............ 73/152, 155, 419, 300, 73/391, 393

[56] References Cited
UNITED STATES PATENTS

| | | | |
|---|---|---|---|
| 974,867 | 11/1910 | Eddy | 73/406 |
| 2,037,949 | 4/1936 | Tate | 73/393 |
| 2,087,494 | 7/1936 | Annin | 73/393 |
| 2,611,267 | 9/1952 | Pennington | 73/406 |

*Primary Examiner*—Donald O. Woodiel
*Attorney, Agent, or Firm*—Eric H. Waters

[57] ABSTRACT

A depth pressure gauge comprising a closed casing having an opening for introduction thereto of the environmental medium whose pressure is to be measured, a sliding element being mounted for free sliding movement in a partition in the casing and responding to the pressure of the medium introduced into the casing. A chamber filled with an elastic compressible fluid such as a liquid, as for example, glycerine receives the sliding element to provide constant equality of the pressure in the chamber and the environmental medium, and a recording device is coupled to the slidable element to record displacement thereof which is indicative of the pressure of the environmental medium.

6 Claims, 1 Drawing Figure

PATENTED APR 23 1974  3,805,620
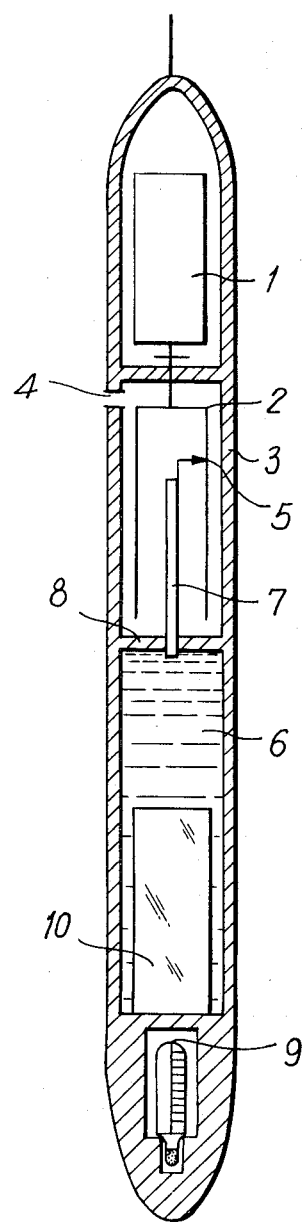

DEPTH PRESSURE GAUGE

This Application is a Continuation of Ser. No. 10,723, filed Feb. 12, 1970, now abandoned.

The present invention relates to depth pressure gauges adapted to measure high pressures in oil, gas, water wells and the like.

Known in the present state of the art are depth pressure gauges comprising a transducer for measuring environmental pressure, a mechanism which interacts with the abovementioned transducer and records pressure readings, and a thermometer.

Widely used among the heretofore known depth pressure gauges is a coiled tube pressure gauge wherein the pressure transducer is a hollow coiled tube. The latter is filled with a suitable fluid and communicates by its open end with the medium under test. The medium acts upon the fluid filling the tube, the latter releases and causes the pointer with a pen fixed to the dead end of the tube, to move. The pen draws the line of pressures on a graph fastened on the surface of a drum which is also free to move progressively along a feed screw which in turn is actuated from a clock mechanism. Simultaneously the depth temperature is measured by a thermometer provided in a thermometric chamber.

The above-described pressure gauge is not adapted to measure high and super-high pressures (800 to 2000 atms) and not practicable for a number of disadvantages:

The presence of material hysteresis caused by a residual strain of the manometric coiled tube.

Great recording scaling when measuring high pressures, which necessitates the use of high-resolution and expensive microscopes adapted to measure pressure ordinates.

Additionally, manometric coiled tubes of small diameters for measuring high pressures are difficult to manufacture.

It is a specific object of the present invention to provide a depth pressure gauge for measuring high and superhigh pressures.

It is another object of the present invention to provide a depth pressure gauge that avoids pressure differences.

It is still another object of the present invention to provide a depth pressure gauge without hysteresis.

It is an additional object of the present invention that no pressure gauge casing will not be subject to strains caused by pressure differences.

It is still an additional object of the present invention that the accuracy is not impaired with increase of the pressure under measurement.

Other objects and advantages of the present invention will become apparent from a detailed consideration of an exemplary embodiment thereof.

These objects are accomplished by the fact that in a depth pressure gauge comprising a transducer for measuring environmental pressure. And a mechanism which interacts with said transducer and records pressure readings, according to the present invention said pressure transducer is essentially a chamber filled with an elastic medium and an element which separates said chamber from the medium under test and responds to the pressure of this medium and transmits it to the filling of the transducer chamber and which in turn is connected to the recording mechanism.

It is preferred a fluid be used as the elastic medium in the pressure transducer chamber.

It is also preferred from the point of view of providing an independent position of the element which responds to and transmits pressures, upon the well temperature that the transducer chamber be provided with a means for volume compensation of thermal expansion of the fluid involved.

The means for volume compensation is preferably made of a material whose thermal expansion coefficient is lower than the material of the chamber.

Implemented according to the present invention is a depth pressure gauge capable of measuring practically unlimited high pressures with high accuracy.

The invention will be better understood by the description of an embodiment given by way of example with due reference to the sole FIGURE of the accompanying drawing, show in longitudinal sectional view a depth pressure gauge according to the present invention.

A clock mechanism 1 is adapted to actuate a graph frame holder with a graph 2 both arranged within a casing 3 provided with an opening 4.

A pen 5 is connected to a pressure transducer constituted as a chamber 6 filled with a fluid say such as glycerine, and separating said chamber from the medium under test by a rod 7 passing through a partition 8 and responding to the pressure of the medium under test and transmitting the pressure to the fluid in said chamber. The rod 7 is connected to the pen 5 which draws a mark on the graph 2 of the graph frame holder actuated by the clock mechanism 1. The mechanism 1, the graph frame holder with the graph 2 and the pen comprise a recording mechanism. Used instead of the rod 7 may be a bellows, or a membrane and the like. The ambient temperature of the depth pressure gauge is measured by a thermometer 9. A body 10 arranged within the chamber 6 is essentially a means for volume compensation of thermal expansion of the fluid filling said chamber.

The necessity to employ said compensator 10 is caused by the fact that when lowering the depth pressure gauge in a well, both the fluid in the chamber 6 and the metal wall of said chamber are heated and expand. However, since the thermal expansion coefficient of the most common fluids exceeds that of the most widely used metals, the expansion of identical volumes of the fluid in the chamber 6 and the walls of said chamber do not compensate each other. Therefore the displacement of the rod 7 depends upon temperature variations.

The volume compensator 10 is adapted to eliminate this effect. It is manufactured from a material having a lower thermal expansion coefficient as compared with those of both the fluid in the chamber 6 and the material of the chamber walls. Such a material may be, for example, quartz glass, featuring lower thermal expansion coefficient than the material of the walls of the chamber 6, made for example, of bronze.

The total volume compensation may be achieved under the following conditions:

$$V_k = V_g(\alpha_g - 3\alpha.)/3(\alpha_x - \alpha.),$$

where $V_k$ is the volume of the chamber 6, $V_g$ is the fluid volume in the chamber 6, $\alpha g$ is the thermal expansion coefficient or the fluid, $\alpha$. is the thermal expansion coefficient of the volume compensator, and $\alpha x$ is the thermal expansion coefficient of the material of the chamber 6.

The value characterizing the displacement of the rod 7 under the effect of the well pressure may be expressed by the following formula below:

$$h = (Vg/S)\beta P,$$

where $h$ is the value characterizing the displacement of the rod 7, $S$ is the cross sectional area of the rod, $Vg$ is the fluid volume in the chamber 6, $\beta$ is the fluid compressibility coefficient, and $P$ is pressure.

Depending upon volume and fluid properties, as well as upon the cross sectional area of the rod 7, its displacement may be different.

The depth pressure gauge of the present invention operates as follows.

The well medium acts through the opening 4 upon the rod 7. The latter displaces and compresses the fluid in the chamber 6 to a pressure equal to the well pressure. In this case the pen 5 will draw a line on the graph 2 corresponding to the position of the rod 7.

Thus, the pressure in the chamber 6 will become equal to that in the well, and there will be no pressure differences on both sides of the rod 7.

Due to this fact the present depth pressure gauge has practically no limit for pressure being measured. This limit may be associated only with the pressure at which intolerable variations of physical properties of both the fluid and materials used occur, i.e. at a pressure of some tens of hundreds of atms. Consequently, the depth pressure gauge disclosed herein will provide examination of wells practically at any depth.

It is worth noting that the accuracy of measurement of said depth pressure gauge increases with the increase in the pressure being measured, since a great many of fluids feature no residual strain and hysteresis.

What is claimed is:

1. In a depth pressure gauge adapted for operation at high pressures of the order of 800 to 2,000 atmospheres comprising a closed casing with rigid walls and an opening to introduce ambient pressure medium being gauged into said casing, a sliding element supported in the casing for free sliding movement and responding to the pressure of the medium being introduced into the casing, means for recording the displacement of said sliding element which characterizes the pressure of the ambient medium, an improvement comprising a chamber with rigid walls under the same internal and external pressure, said chamber being permanently isolated from the ambient medium, said chamber being initially filled with a liquid under atmospheric pressure, said sliding element extending into said chamber in contact with said liquid to provide constant equality of the pressure of the liquid in the chamber and the ambient medium.

2. A depth pressure gauge as claimed in claim 1, wherein the liquid is glycerine.

3. A depth pressure gauge adapted for operation at high pressures of the order of 800 to 2,000 atmospheres comprising a casing provided with an opening for admission of an environment medium thereinto, a tranducer for measuring the pressure of the environmental medium including a first chamber filled with a liquid and isolated from the environmental medium, and an element slidably mounted in said casing and extending into the first chamber, said casing being provided with a second chamber into which the environmental medium is introduced, and a partition separating the chambers, said element of the transducer being slidable in said partition and extending into said second chamber to respond to the pressure of the environmental medium and transmit the pressure to the liquid which then becomes equalized in pressure with said environmental medium as said element is displaced, and means coupled to said element for recording pressure readings in accordance with the displacement of the element.

4. A depth pressure gauge as claimed in claim 3, comprising means in said chamber for volume compensation of thermal expansion of said liquid, the latter said means being made of a material whose coefficient of thermal expansion is lower than the material of the chamber.

5. A depth pressure gauge as claimed in claim 3, wherein said liquid is glycerine.

6. A depth pressure gauge as claimed in claim 1 comprising means in said chamber for volume compensation of thermal expansion of the liquid, said means being made of a material whose coefficient of thermal expansion is lower than that of the material of the chamber.

* * * * *